US007370800B2

(12) United States Patent
Moroto

(10) Patent No.: US 7,370,800 B2
(45) Date of Patent: May 13, 2008

(54) INFORMATION PROCESSING METHOD

(75) Inventor: Mineko Moroto, Tokyo (JP)

(73) Assignee: Vodafone Group PLC, Newbury (GB)

( * ) Notice: Subject to any disclaimer, the term of this patent is extended or adjusted under 35 U.S.C. 154(b) by 234 days.

(21) Appl. No.: 11/243,485

(22) Filed: Oct. 5, 2005

(65) Prior Publication Data

US 2006/0071080 A1 Apr. 6, 2006

Related U.S. Application Data

(63) Continuation of application No. PCT/JP2004/004983, filed on Apr. 7, 2004.

(30) Foreign Application Priority Data

Apr. 7, 2003 (JP) ............................ P2003-102942

(51) Int. Cl.
*G06K 7/10* (2006.01)
(52) U.S. Cl. ................. 235/462.1; 235/462.09
(58) Field of Classification Search ............. 235/462.1, 235/462.09, 375, 462.24
See application file for complete search history.

(56) References Cited

U.S. PATENT DOCUMENTS

| | | | | |
|---|---|---|---|---|
| 5,299,026 | A | * | 3/1994 | Vincett et al. ............... 358/401 |
| 5,635,697 | A | | 6/1997 | Shellhammer et al. |
| 5,873,735 | A | * | 2/1999 | Yamada et al. ............. 434/316 |
| 5,896,403 | A | | 4/1999 | Nagasaki et al. |
| 5,905,251 | A | * | 5/1999 | Knowles ................ 235/472.01 |
| 6,052,813 | A | | 4/2000 | Nagasaki et al. |
| 6,058,498 | A | | 5/2000 | Nagasaki et al. |
| 6,267,296 | B1 | | 7/2001 | Ooshima et al. |
| 6,624,874 | B2 | * | 9/2003 | Revelli et al. ................. 352/90 |
| 6,819,643 | B2 | * | 11/2004 | Kobayashi et al. ....... 369/53.21 |
| 6,847,967 | B1 | * | 1/2005 | Takano ......................... 707/10 |
| 6,972,856 | B1 | * | 12/2005 | Takahashi ................... 358/1.14 |
| 2004/0135906 | A1 | * | 7/2004 | Okada ......................... 348/239 |

FOREIGN PATENT DOCUMENTS

| | | |
|---|---|---|
| AU | 9348337 | 4/1994 |
| AU | 668987 B | 5/1996 |
| DE | 693 29 120 T | 3/2001 |
| EP | 0 670 555 A1 | 9/1995 |
| EP | 0 996 083 A2 | 4/2000 |
| JP | 6-12515 | 1/1994 |
| JP | 6-231466 | 8/1994 |

(Continued)

OTHER PUBLICATIONS

Office Action issued by China Patent Office.

*Primary Examiner*—Ahshik Kim
(74) *Attorney, Agent, or Firm*—Kratz, Quintos & Hanson, LLP.

(57) ABSTRACT

Analyzing copyright information written in a predetermined position of an optically read two-dimensional code symbol (step S41). After that, performing analysis in accordance with the data type, e.g., URL non-display data (UND), text data (TXD), binary data (BND), sound data (MSD), or image data (IMD), of content data in the two-dimensional code symbol (steps S42 to S54). Finally, displaying the result of analysis together with the copyright information on a display unit to provide an operator with the contents of information written in a predetermined position of a two-dimensional code. This makes it possible to appropriately process the information expressed by the two-dimensional code.

13 Claims, 14 Drawing Sheets

FOREIGN PATENT DOCUMENTS

| | | |
|---|---|---|
| JP | 9-134403 | 5/1997 |
| JP | 10-187873 | 7/1998 |
| JP | 10-187907 | 7/1998 |
| JP | 10-187908 | 7/1998 |
| JP | 10-187909 | 7/1998 |
| JP | 10-187910 | 7/1998 |
| JP | 10-261059 | 9/1998 |
| JP | 11-7511 | 1/1999 |
| JP | 11-7512 | 1/1999 |
| JP | 3181866 | 1/1999 |
| JP | 11-224112 | 8/1999 |
| JP | 11-316808 | 11/1999 |
| JP | 11-328301 | 11/1999 |
| JP | 11-328303 | 11/1999 |
| JP | 2001-125586 | 5/2001 |
| JP | 2001-143028 | 5/2001 |
| JP | 2001-160120 | 6/2001 |
| JP | 2001-175822 | 6/2001 |
| JP | 2001-184450 | 7/2001 |
| JP | 2001-184469 | 7/2001 |
| JP | 2002-57737 | 2/2002 |
| KR | 225112 | 9/1995 |
| TW | 242681 | 11/2005 |
| WO | WO94/08314 | 4/1994 |

* cited by examiner

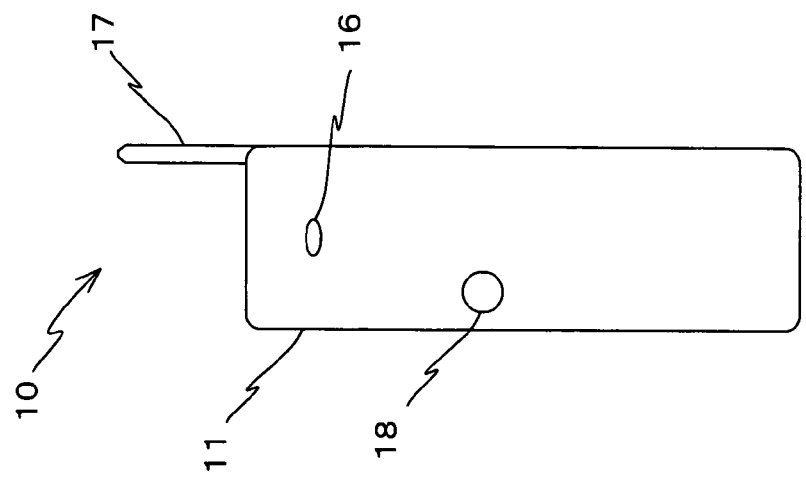
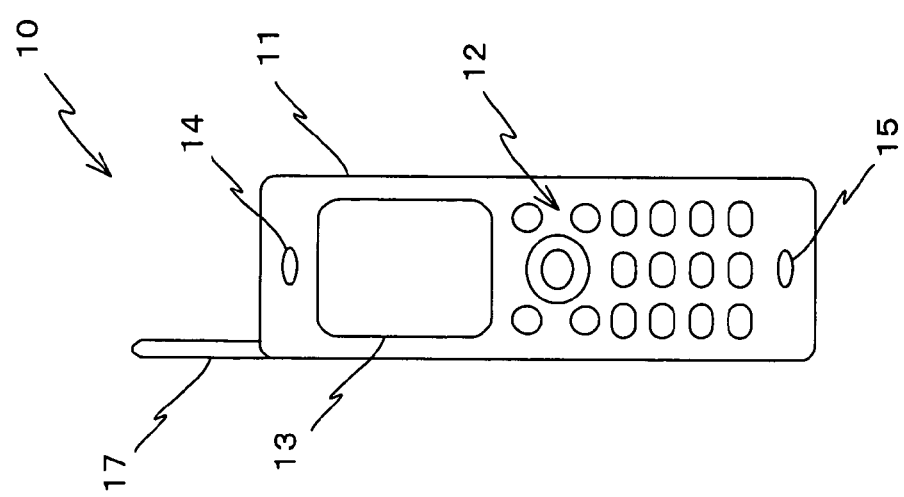

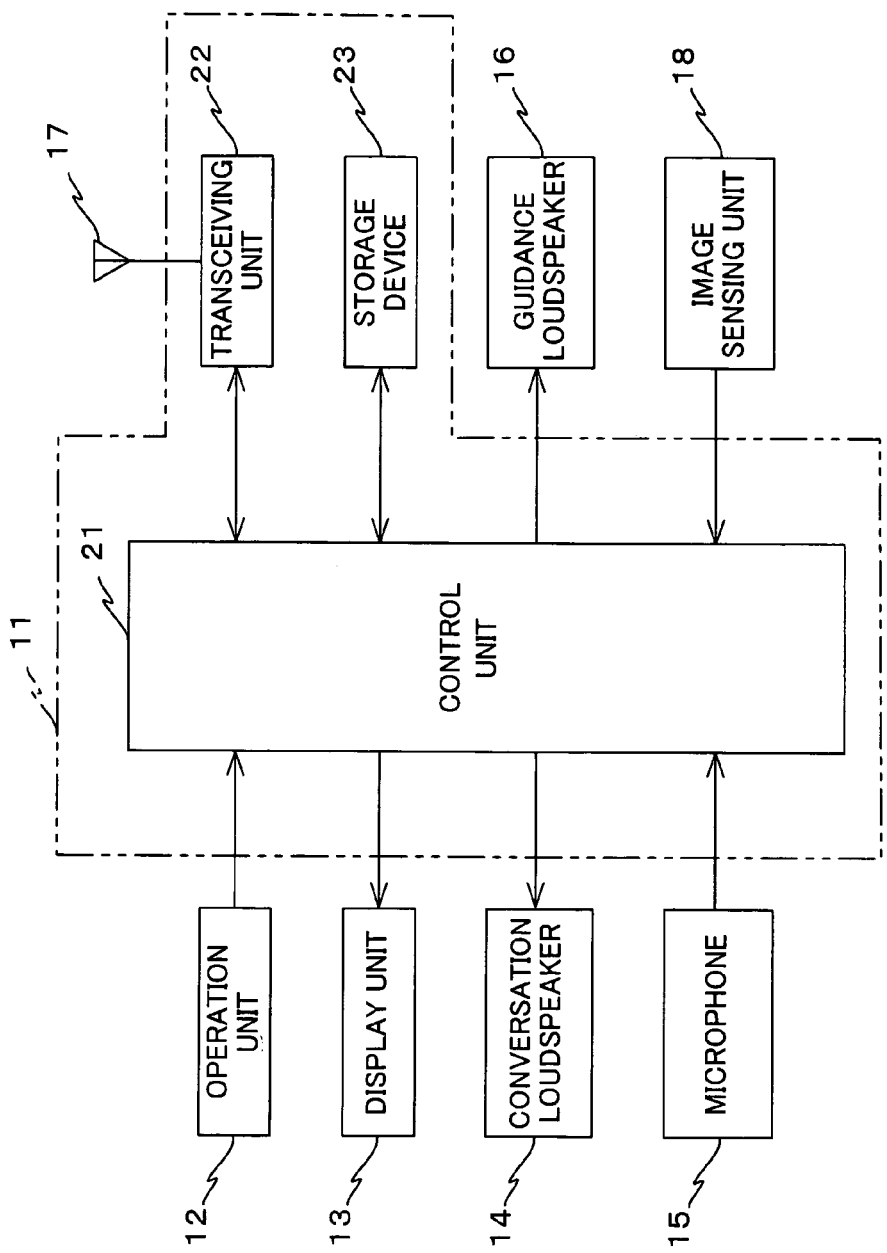

DYID

| b7 | b6 | b5 | b4 | b3 | b2 | b1 | b0 | |
|---|---|---|---|---|---|---|---|---|
| 0 | 0 | 0 | 0 | 0 | 0 | 0 | 0 | : URL NON-DISPLAY DATA(UND) |
| 0 | 0 | 0 | 0 | 0 | 0 | 1 | 0 | : TEXT DATA(TXD) |
| 0 | 0 | 0 | 0 | 1 | 0 | 0 | 0 | : BINARY DATA(BND) |
| 0 | 0 | 0 | 0 | 1 | 0 | 0 | 0 | : SOUND DATA(MSD) |
| 0 | 0 | 0 | 0 | 1 | 0 | 1 | 0 | : IMAGE DATA(IMD) |
| | | | OTHERS | | | | | : RESERVE |

INFORMATION PROCESSING METHOD

RELATED APPLICATION

This is a continuation application of the international patent application No. PCT/JP2004/004983 filed with Application date: Apr. 7, 2004.

BACKGROUND OF THE INVENTION

The present invention relates to an information processing method and, more particularly, to an information processing method of reading a two-dimensional code symbol in which information is expressed by the two-dimensional code, and processing the information expressed as the -two-dimensional code symbol.

BACKGROUND ART

Conventionally, one-dimensional codes used for, e.g., an EAN (European Article Number (in Japan, JAN (Japanese Article Number))) code and two-dimensional codes such as a QR (Quick Response) code are used in various fields. The one-dimensional codes are used to express numerical information, alphabetical information, or alphanumerical information. On the other hand, the two-dimensional codes are expected to be used in various aspects because the amount of expressible information is much larger than that of the one-dimensional codes.

As one method of using the two-dimensional codes, a technique is proposed by which a symbol (to be referred to as a "two-dimensional code symbol" in this description) obtained by expressing operation guidance sound data for such as a ring tone or alarm tone in a telephone apparatus such as a cellular phone by using the two-dimensional code is optically read and stored in the telephone apparatus (e.g., Japanese Patent Publication of Unexamined application No. 2001-292199; to be referred to as a "prior art" hereinafter). In this technique, after an operation mode of the telephone apparatus is set to a read mode for sound data such as melody data, the two-dimensional code symbol is optically read.

Then, it is determined whether data, carried from the read two-dimensional code symbol, includes the sound data. If this determination is affirmative, it is notified that the sound data is read. Finally, the sound data is stored in a storage device in the telephone apparatus in accordance with store instructions from an operator of the telephone apparatus.

The above-mentioned prior art is very superior in the following points: the two-dimensional code symbol is used to express the sound data; and the operation guidance sound data for such as the ring tone or alarm tone in the telephone apparatus can be simply input and stored. Since, however, the two-dimensional code symbol can express a large amount of information, it enables to express media data for such as images (including still images and motion images) in addition to the sound data. There exist many of such media data protected by copyright as digital contents.

The protection of the digital contents by copyright permits a prohibition of, e.g., reproduction of the digital contents. Since the storing of the digital contents into the storage device in the prior art is equivalent to reproduction, this storing into the storage device without careful consideration may cause an infringement of the right of reproduction as a kind of copyright. In addition, to transmit the digital contents to the public or to make them transmittable may cause an infringement of the right of public transmission as a kind of copyright.

It is, therefore, being strongly desired to prevent such infringements of copyright without imposing any burden on the operator of the telephone apparatus or the like.

In addition, since various types of information can be expressed by the two-dimensional codes, so it is being desired to perform appropriate processing depending on the type of information.

The present invention has been made in consideration of the above situation, and has as its object to provide an information processing method which reads a two-dimensional code symbol, and appropriately processes information expressed as the two-dimensional code symbol.

SUMMARY OF THE INVENTION

According to the first aspect, the present invention is an information processing method of reading a two-dimensional code symbol in which information is expressed by a two-dimensional code, and processing the information expressed as the two-dimensional code symbol, comprising the steps of: optically reading the two-dimensional code symbol; analyzing copyright information of content data in the two-dimensional code symbol, the copyright information being written in a predetermined position of the two-dimensional code symbol; and performing display corresponding to the content data, as well as performing display with regard to a process capable for the content data in accordance with a result of analysis of the copyright information.

In this information processing method, the copyright information of the content data in the two-dimensional code symbol, which the copyright information is written in the predetermined position of the two-dimensional code symbol optically read in the step of reading, is analyzed in the step of analyzing. For example, the copyright information is designation information that designates whether the content data can be saved or transferred, and whether media data (data of, e.g., sounds or images) in the content data can be saved or transferred. Subsequently, display depending on the content data is performed in the displaying step, and display with regard to a process capable for the content data is performed in accordance with a result of analysis of the copyright information.

In the first information processing method of the present invention, it is therefore possible to read the two-dimensional code symbol, and accordingly to appropriately process information expressed as the two-dimensional code symbol by reflecting an intention of a copyright holder of the information.

In the first information processing method of the present invention, in case that the content data is text data, characters of the text data may be displayed in the step of performing display corresponding to the content data. Also, in case that the content data is sound data, an icon representing sound data may be displayed. Furthermore, in case that the content data is image data, the image data may be displayed with expansion.

According to the second aspect, the present invention is an information processing method of reading a two-dimensional code symbol in which information is expressed by a two-dimensional code, and processing the information expressed as the two-dimensional code symbol, comprising the steps of: optically reading the two-dimensional code symbol; and the performing one of display and undisplay with regard to URL (Uniform Resource Locator) data included in content data in accordance with content data type information and the content data both written in a predetermined position of the two-dimensional code symbol.

In this information processing method, the URL data included in the content data is displayed or undisplayed in the step of performing one of display and undisplay in accordance with the content data type information and the content data both written in a predetermined position of the two-dimensional code symbol optically read in the step of reading. In the second information processing method of the present invention, it is therefore possible to display or undisplay an URL in accordance with an intention of a person who has expressed the URL by using the two-dimensional code symbol.

In the second information processing method of the present invention, the content data type information may be undisplayed in order to undisplay the URL. Also, URL data, and URL mask data to be overwritten on URL display may be included in the content data. This makes it possible to undisplay the URL in the step of performing one of display and undisplay.

According to the third aspect, the present invention is an information processing method of reading a two-dimensional code symbol in which information is expressed by a two-dimensional code, and processing the information expressed as the two-dimensional code symbol, comprising the steps of: optically reading the two-dimensional code symbol; determining whether content data type information written in a predetermined position of the two-dimensional code symbol indicates that content data is binary data; and displaying to a purport that the content data is binary data when an affirmative determination is made in the step of determining for the binary data.

In this information processing method, whether content data type information written in the predetermined position of the two-dimensional code symbol optically read in the reading step indicates that content data is binary data, is determined in the step of determining. In case that this determination is affirmative, to the effect that the content data is binary data is displayed in the step of displaying.

In the third information processing method of the present invention, it is therefore possible to exchange desired data having meanings only for specific persons who know the data form, even when data having an intended form other than data forms generally used as the content data is expressed by the two-dimensional code symbol.

The third information processing method of the present invention may further comprise the steps of: determining whether the content data type information indicates that the content data is text data; and displaying characters of the content data when an affirmative determination is made in the step of determining for the text data.

Also, the third information processing method of the present invention may further comprise the steps of: determining whether the content data type information indicates that the content data is sound data; and displaying an icon corresponding to the sound data when an affirmative determination is made in the step of determining for the sound data.

Additionally, the third information processing method of the present invention may further comprise the steps of: determining whether the content data type information indicates that the content data is image data; and displaying the image data with expansion when an affirmative determination is made in the step of determining for the image data.

As has been described above, the first information processing method of the present invention achieves the effect by which the information expressed as the two-dimensional code symbol can be appropriately processed by reflecting the intention of the copyright holder of the information.

Also, the second information processing method of the present invention achieves the effect by which it is possible to display or to undisplay the URL in accordance with the intention of the person who has expressed the URL by using the two-dimensional code symbol.

Furthermore, the third information processing method of the present invention achieves the effect by which the desired data having meanings only for the specific persons who know the data form can be exchanged, even when data having a desired form other than data forms generally used as the content data is expressed by the two-dimensional code symbol.

BRIEF DESCRIPTION OF THE DRAWINGS

FIGS. 1A and 1B are views showing the external appearance of a cellular phone using an information processing method according to an embodiment of the present invention;

FIG. 2 is a functional block diagram of the cellular phone shown in FIG. 1;

DETAILED DESCRIPTION

Figure 3A:
FIG. 3A is a view showing a one-dimensional code symbol (JAN symbol)
Figure 3B:
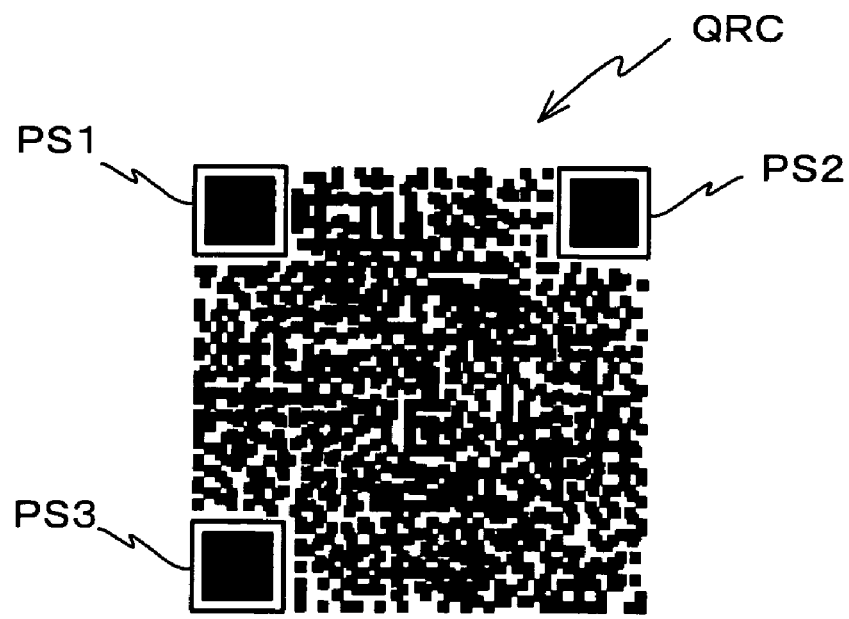
FIG. 3B is a view showing an example of a two-dimensional code symbol (QR symbol)

An embodiment of the present invention will be described below with reference to FIGS. 1 to 14.

Referring FIGS. 1 and 2, it is schematically illustrated that the structure of the cellular phone 10 using an information processing method according to the embodiment. Referring FIGS. 1A and 1B, it is illustrated that a front view of the external appearance of the cellular phone 10, and a rear view of the external appearance of the cellular phone 10. Referring FIG. 2, it is illustrated that the functional block configuration of the cellular phone 10.

As comprehensively shown in FIGS. 1 and 2, the cellular phone 10 comprises (a) a cellular phone body 11 comprising the control unit 21, transceiving unit 22, and storage device 23, (b) the operation unit 12 comprising a ten-key pad for inputting a telephone number to the control unit 21, and function keys for inputting various instructions such as operation modes switching to the control unit 21, and (c) the display unit 13 comprising a liquid crystal display device which displays, e.g., an operation guidance, operation status, and received message in accordance with instructions from the control unit 21. The cellular phone 10 also comprises (d) the conversation loudspeaker 14 for playing back a speech signal transmitted from a communication partner during conversation, the microphone 15 for inputting speech during conversation, and (e) the guidance loudspeaker 16 for generating a ring tone or guidance tone in accordance with instructions from the control unit 21. The cellular phone 10 further comprises (f) the antenna 17 being connected to the transceiving unit 22 to transceive radio signals with a base station, and (g) an image sensing unit 18 for reading a one-dimensional code or two-dimensional code (to be described later).

The image sensing unit 18 optically reads the JAN code symbol (to be referred to as a "JAN symbol" hereinafter) JNC, which expresses JAN-coded information as shown in FIG. 3A, and a QR code symbol (to be referred to as a "QR symbol" hereinafter) QRC, which expresses information by the QR code as one type of two-dimensional codes. The JAN symbol JNC has an arrangement in which dark-portion straight lines (black straight lines in FIG. 3A) and bright-portion straight lines (white blanks in FIG. 3A) having various thicknesses are one-dimensionally arranged along a direction perpendicular to these straight lines in accordance with numerical data to be expressed. Also, in the QR symbol QRC, dark-portion rectangles (black rectangles in FIG. 3B) and bright-portion rectangles (white rectangles in FIG. 3B) are two-dimensionally arranged in accordance with data to be expressed. The QR symbol QRC has a rectangular shape as a whole, and positioning symbols PS1, PS2, and PS3 are arranged in three corners of the rectangle.

The control unit 21 comprises a central processing unit (CPU), digital signal processor (DSP), random access memory (RAM), and read only memory (ROM), and performs various types of data processing and controls the operations of the other components described above, in order to realize general cellular phone functions. Also, the control unit 21 processes information expressed in the JAN symbol JNC or QR symbol QRC, and optically read by the image sensing unit 18. These processing and control by the control unit 21 are performed by executing built-in programs while appropriately referring to operations by an operator.

It will be described below for information processing by the above structured cellular phone 10 on a code optically read by the image sensing unit 18.

Assume that when an object to be optically read by the image sensing unit 18 is the JAN symbol, JNC, numerical information is expressed by a form determined in JIS (Japanese Industrial Standards), X0501. Assume also that when an object to be optically read by the image sensing unit 18 is the QR symbol, QRC, information is expressed by a form determined in JIS X0510.

Figure 4:
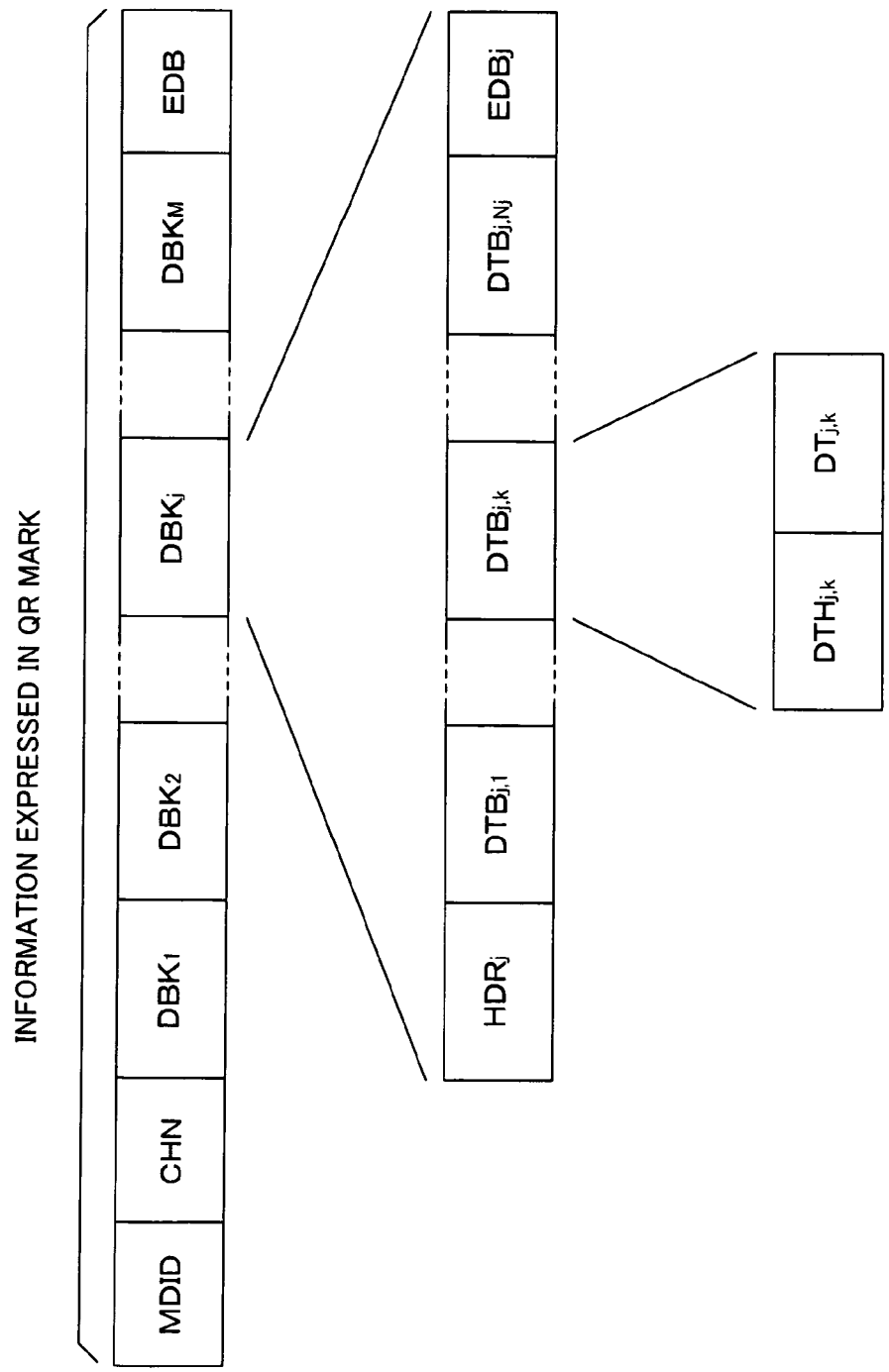
FIG. 4 is a view for explaining the data structure of information expressed by the QR symbol shown in FIG. 3B.

That is, as shown in FIG. 4, the QR symbol QRC expresses a mode indicator MDID, a character number indicator CHN, data blocks $DBK_1$ to $DBK_M$, and an end indicator EDB. Each data block $DBK_j$ (j=1 to M) is made up of a data block header $HDR_j$, data parts $DTB_{j,1}$ to $DTB_{j,Nj}$, and an end indicator $EDB_j$. Each data part $DTB_{j,k}$ (k=1 to $N_j$) is made up of a data part header $DTH_{j,k}$ and data $DT_{j,k}$.

The mode indicator MDID indicates a mode by which a data string of the data block $DBK_j$ (j=1 to M) is coded. For example, the mode indicator MDID indicates numerical coding, alphanumerical coding, 8-bit byte coding, or kanji character coding. Note that in this embodiment, the mode indicator MDID having a specific value is the end indicator EDB described above. Also, the character number indicator CHN indicates the total number of characters of all the data blocks $DBK_j$ (j=1 to M).

Figure 5:
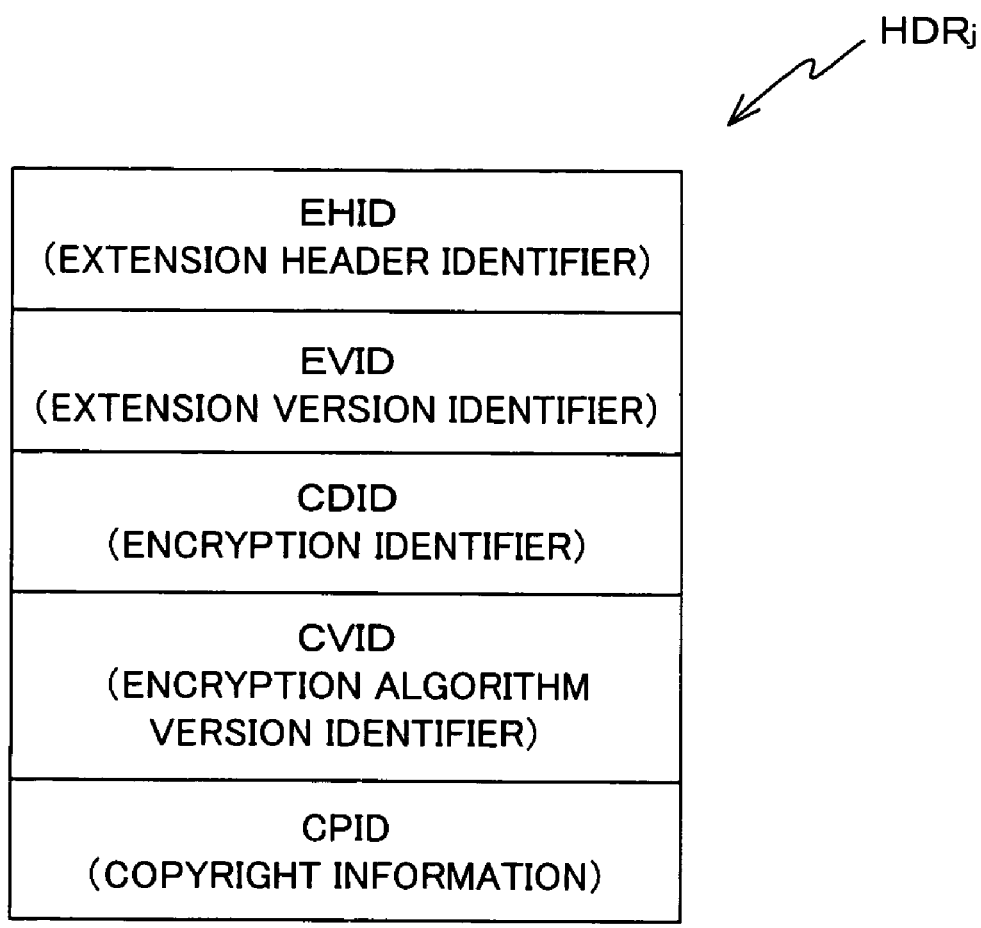
FIG. 5 is a view for explaining the structure of a data block header shown in FIG. 4.

As shown in FIG. 5, the data block header $HDR_j$ has (i) an extension header identifier EHID. If the extension header identifier EHID is significant, the data block header $HDR_j$ has (ii) an extension version identifier EVID, (iii) an encryption identifier CDID, (iv) an encryption algorithm version identifier CVID, and (v) copyright information CPID. In case that the extension header identifier EHID is insignificant, a data string immediately before the end indicator $EDB_j$ has no specific structure, and is coded by the mode indicated by the mode indicator MDID.

The extension header identifier EHID indicates whether a data string after the extension header identifier EHID in the data block $DBK_j$ (j=1 to M) is a data string to be extended as will be described later. In addition, the extension version identifier EVID indicates the version of this extension process. Also, the encryption identifier CDID indicates whether the data $DT_{j,k}$ (k=1 to $N_j$) is encrypted. Furthermore, the encryption algorithm version identifier CVID indicates the encryption algorithm version when the data $DT_{j,k}$ (k=1 to $N_j$) is encrypted.

Figure 6:
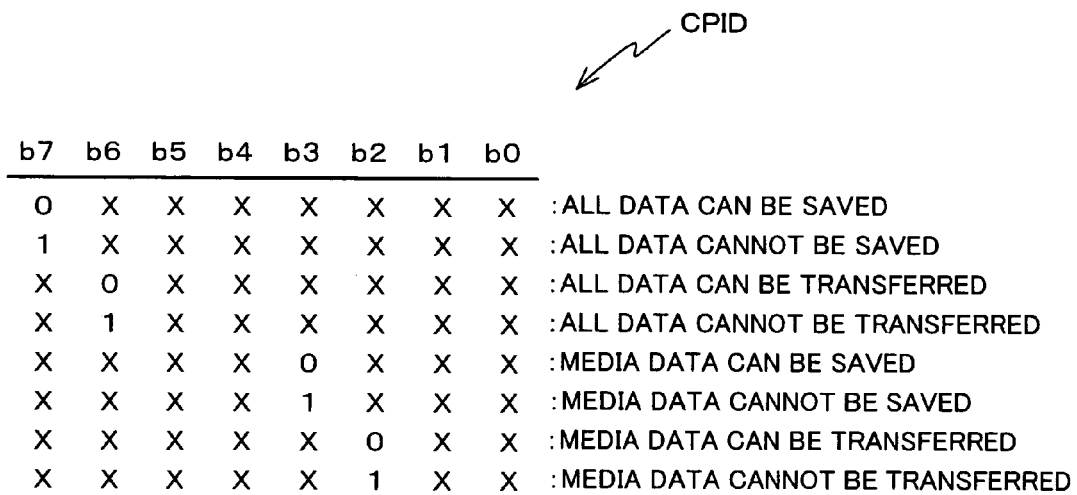
FIG. 6 is a view for explaining an example of copyright information shown in FIG. 5.

The copyright information CPID indicates what kind of processing can be performed for the data $DT_{j,k}$ (k=1 to $N_j$) from the relationship with the copyright. In this embodiment, the copyright information CPID has an 8-bit arrangement as shown in FIG. 6, and indicates whether all data can be saved and transferred, and whether media data can be saved and transferred. All data herein mentioned is all of the data $DT_{j,k}$ (k=1 to $N_j$) contained in the data block $DBK_j$. Also, in this embodiment, media data is data $DT_{j,k}$ which is identified as sound data or image data by a data type identifier DYID of the after-mentioned data part header $DTH_{j,k}$ (k=1 to $N_j$).

Figure 7:
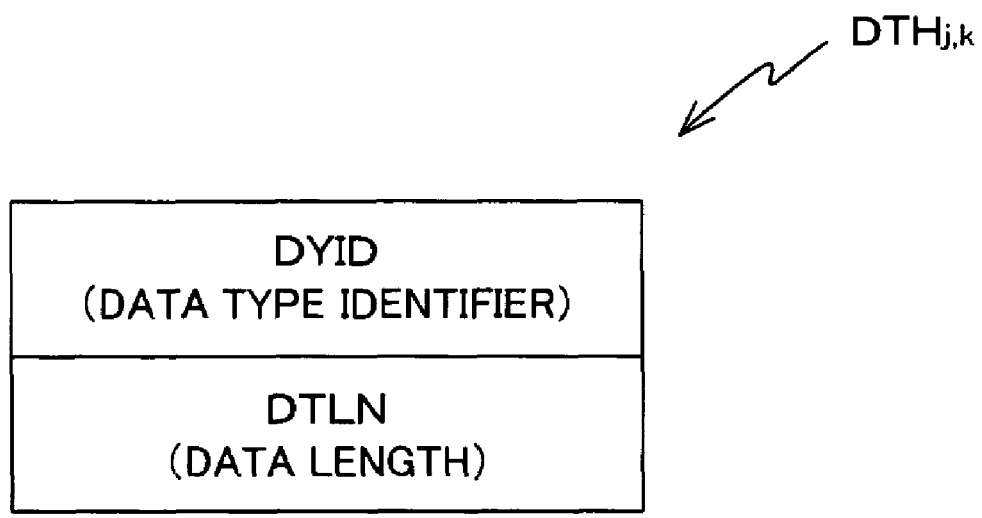
FIG. 7 is a view for explaining the structure of a data part header shown in FIG. 4.

As shown in FIG. 7, the data part header $DTH_{j,k}$ (k=1 to $N_j$) is made up of the data type identifier DYID and a data length DTLN.

Figure 8:
FIG. 8 is a view for explaining an example of a data type identifier shown in FIG. 7.

The data type identifier DYID indicates the data type of $DT_{j,k}$ (k=1 to $N_j$). In this embodiment, the data type identifier DYID has an 8-bit arrangement as shown in FIG. 8, and indicates URL non-display data (UND), text data (TXD), binary data (BND), sound data (MSD), or image data (IMD). Note that a shift JIS code is used as the URL non-display data (UND) and text data (TXD).

A code optically read by the image sensing unit 18 of the cellular phone 10 is processed as follows.

Firstly, it will be described below for information processing on the JAN symbol JNC. In this information processing on the JAN symbol JNC, in step S11 of FIG. 9A, the image sensing unit 18 optically reads the JAN symbol, JNC. The result of reading is supplied from the image sensing unit 18 to the control unit 21.

Then, in step S12, the control unit 21 decodes the result of reading from the image sensing unit 18. Subsequently, in step S13, the control unit 21 extracts a data string from the result of decoding.

Figure 9A:
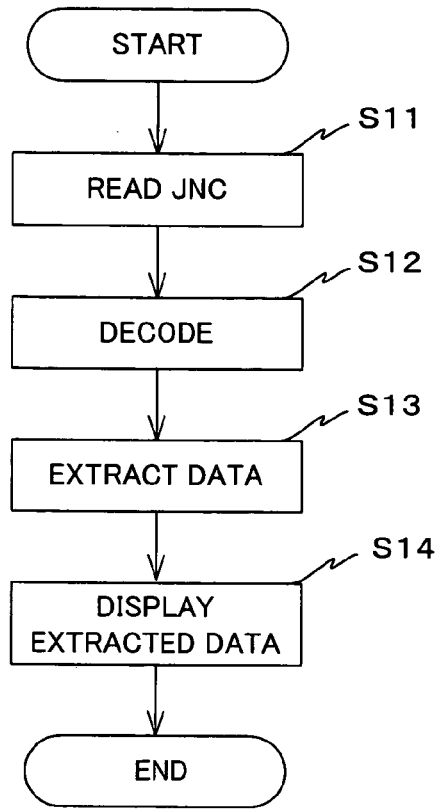
FIGS. 9A and 9B are views for explaining processing for the JAN symbol.
Figure 9B:
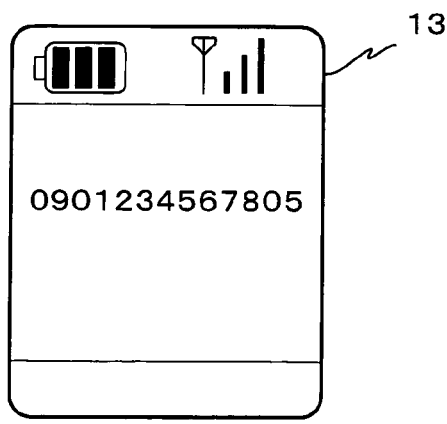

In step S14, the control unit 21 controls the display unit 13 to display the extracted data on it. An example of the extracted data displayed on the display unit 13 is shown in FIG. 9B.

Next, it will be described below for information processing on the QR symbol QRC. To simplify the explanation, assume that information expressed by the QR symbol QRC contains one data block, i.e., contains only the data block DBK$_1$. Assume also that the after-mentioned non-correspondence flag is reset to OFF at the start of this processing.

Figure 10:
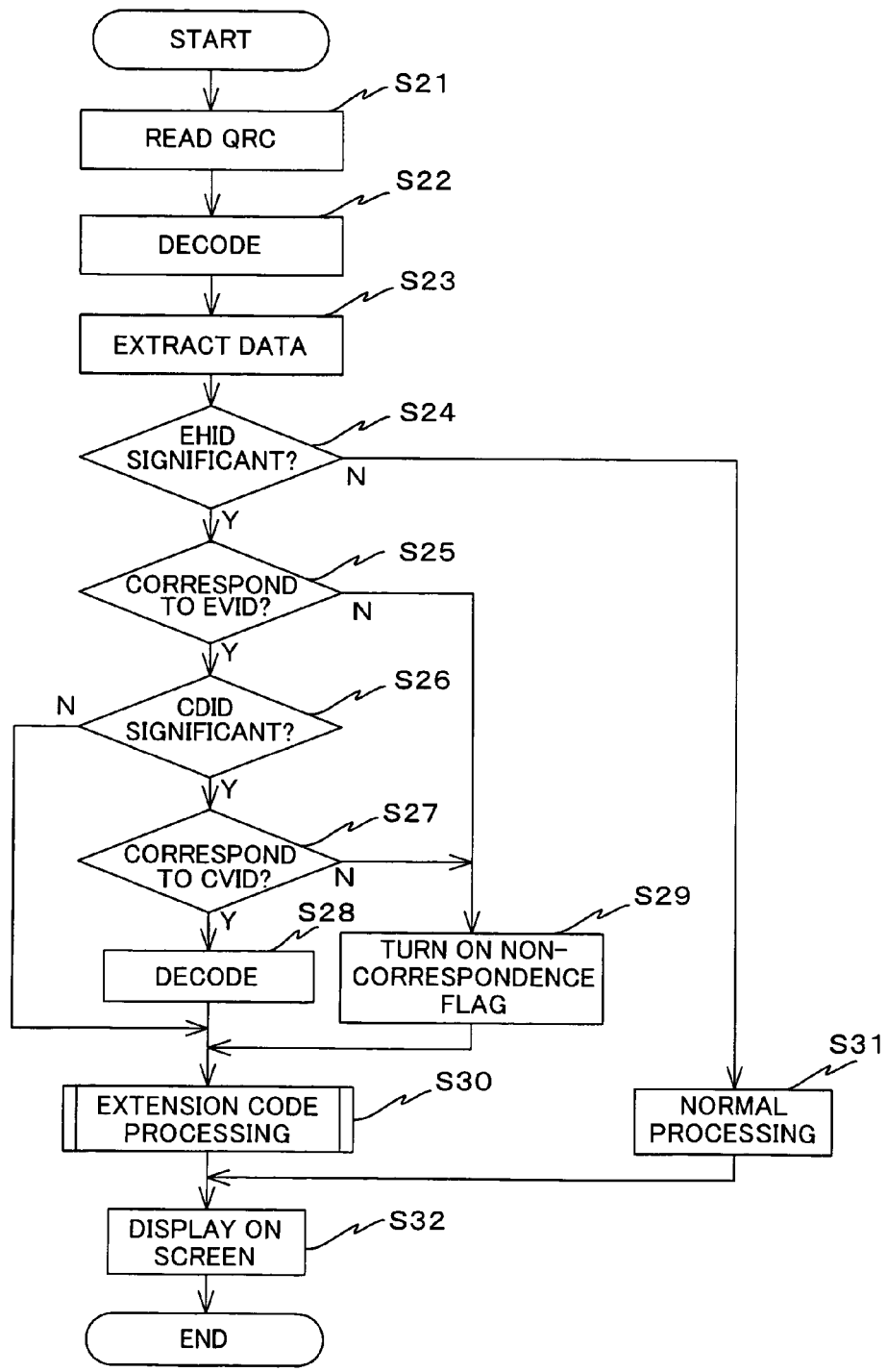
FIG. 10 is a flowchart for explaining processing for the QR symbol.

In this information processing on the QR symbol QRC, in step S21 of FIG. 10, the image sensing unit 18 optically reads the QR symbol, QRC. The result of reading is supplied from the image sensing unit 18 to the control unit 21.

Then, in step S22, the control unit 21 decodes the result of reading from the image sensing unit 18. Subsequently, in step S23, the control unit 21 extracts a data string from the result of decoding on the basis of the mode indicator MDID and character number indicator CHN.

Figure 11:
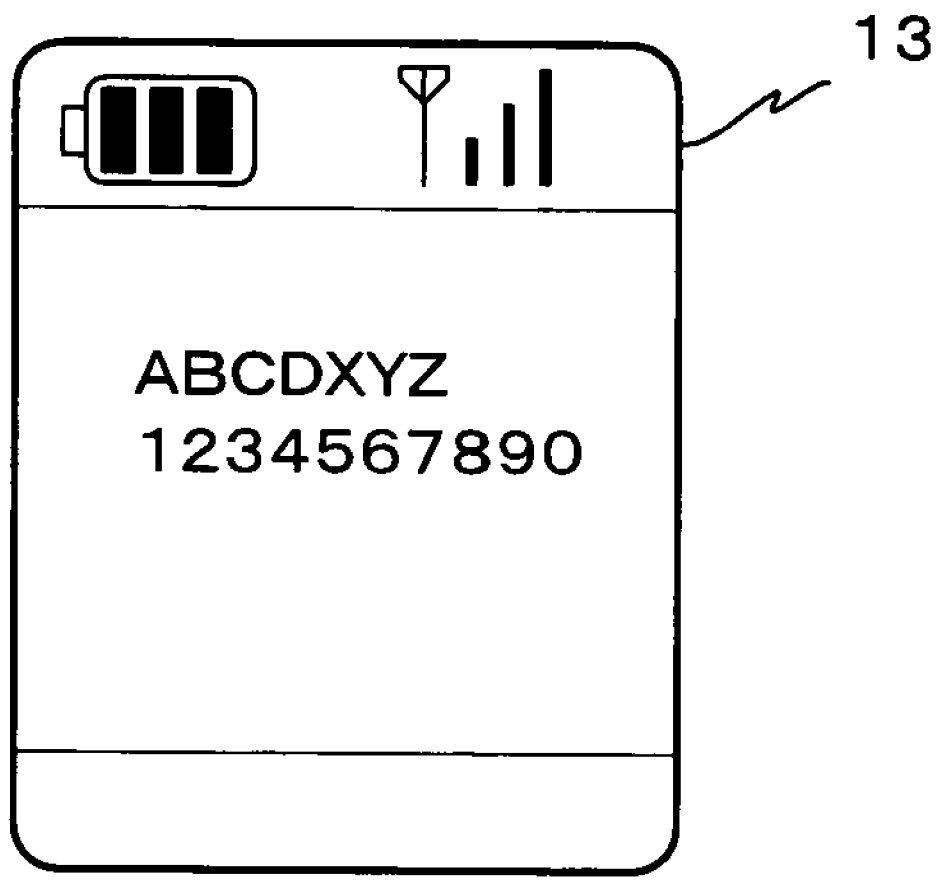
FIG. 11 is a view showing a display example of the results of normal processing shown in FIG. 10.
Figure 12:
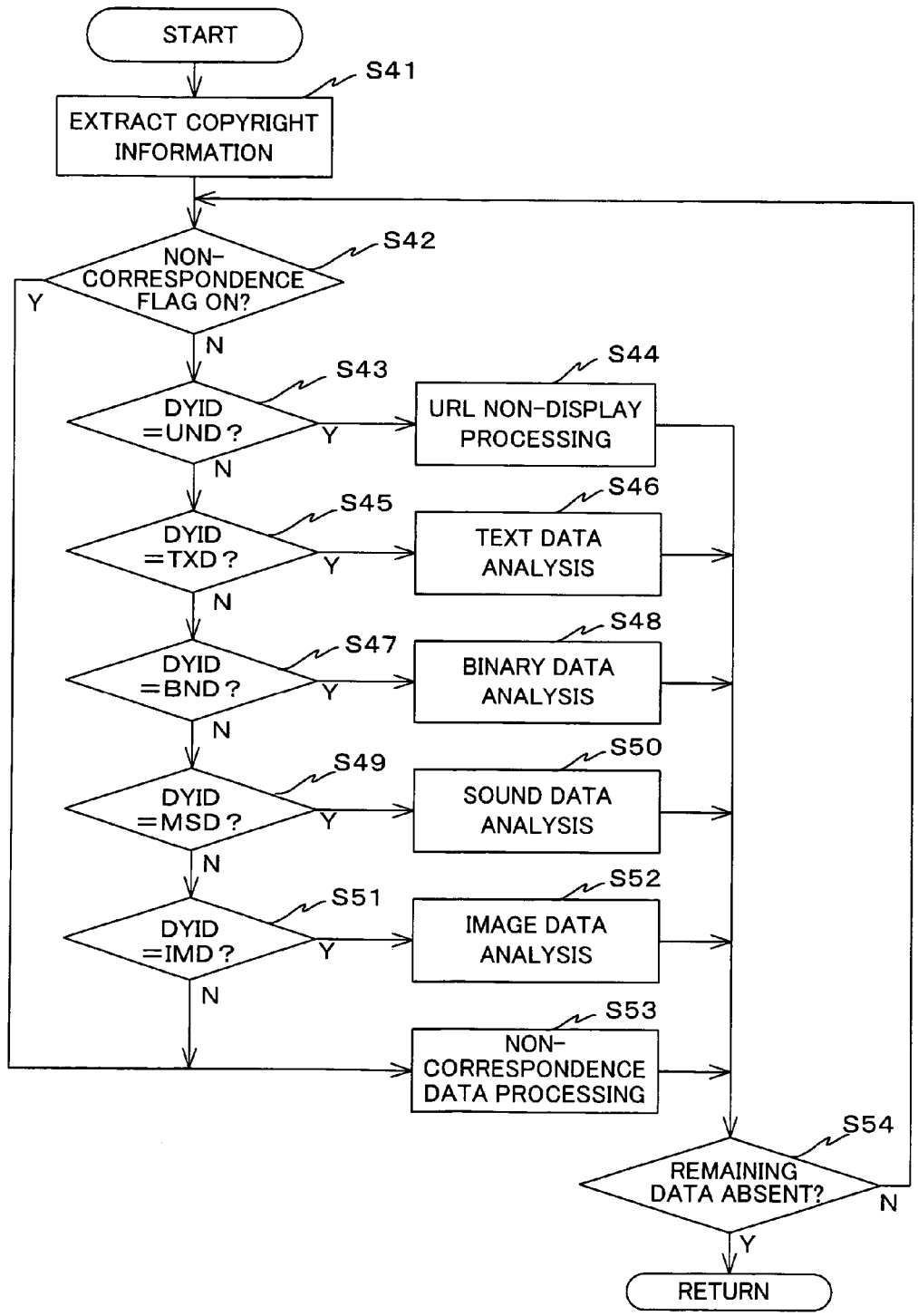
FIG. 12 is a flowchart for explaining an extension processing shown in FIG. 10.

In step S24, the control unit 21 determines whether the extension header identifier EHID is significant. If this determination is negative, the flow advances to step S31. In step S31, the control unit 21 performs normal processing by assuming that a data string after the character number indicator CHN is coded by the mode indicated by the mode indicator MDID. Subsequently, in step S32, the display unit 13 displays the result of processing in step S31, under the control of the control unit 21. A display example in this case is shown in FIG. 11. Namely, a display example when the mode indicator MDID indicates alphanumerical coding is shown in FIG. 11. When the data is thus displayed on the screen, the information processing concerning the QR symbol QRC is completed.

Referring back to FIG. 10, if the determination in step S24 is affirmative, the flow advances to step S25. In step S25, the control unit 21 determines whether the cellular phone 10 corresponds to the extension version indicated by the extension version identifier EVID. If this determination is negative, the flow advances to step S29. In step S29, the control unit 21 turns on the non-correspondence flag. After that, the flow advances to subroutine S30.

If the determination in step S25 is affirmative, the flow advances to step S26. In step S26, the control unit 21 determines whether the data DT$_{j,k}$ (k=1 to N$_j$) is encrypted by referring to the encryption identifier CDID. If this determination is negative, the flow advances to subroutine S30.

If the determination in step S26 is affirmative, the flow advances to step S27. In step S27, the control unit 21 determines whether the cellular phone 10 corresponds to the encryption algorithm indicated by the encryption algorithm version identifier CVID. If this determination is negative, the flow advances to step S29. In step S29, the control unit 21 turns on the non-correspondence flag. After that, the flow advances to subroutine S30.

If the determination in step S27 is affirmative, the flow advances to step S28. In step S28, the control unit 21 decodes the data DT$_{j,k}$ (k=1 to N$_j$). After that, the flow advances to subroutine S30.

In subroutine S30, an information extension process is performed. In this extension process, in step S41 of FIG. 12, the copyright information CPID is extracted. Subsequently, in step S42, the control unit 21 determines whether a non-correspondence code flag is ON. If this determination is affirmative, the flow advances to step S53. In step S53, the control unit 21 performs predetermined non-correspondence data processing. After that, the flow advances to step S54.

If the determination in step S42 is negative, the flow advances to step S43. In step S43, the control unit 21 determines whether the data type identifier is URL non-display data (UND). If this determination is affirmative, the flow advances to step S44. In step S44, the control unit 21 performs URL non-display processing in which a URL found in the data is not displayed. After that, the flow advances to step S54.

If the determination in step S43 is negative, the flow advances to step S45. In step S45, the control unit 21 determines whether the data type identifier is text data (TXD). If this determination is affirmative, the flow advances to step S46. In step S46, the control unit 21 analyzes the text data, and makes preparations to display characters. After that, the flow advances to step S54.

If the determination in step S45 is negative, the flow advances to step S47. In step S47, the control unit 21 determines whether the data type identifier is binary data (BND). If this determination is affirmative, the flow advances to step S48. In step S48, the control unit 21 analyzes the binary data, and makes preparations to display an icon of the binary data and display information indicating that the data is binary data. After that, the flow advances to step S54.

If the determination in step S47 is negative, the flow advances to step S49. In step S49, the control unit 21 determines whether the data type identifier is sound data (MSD). If this determination is affirmative, the flow advances to step S50. In step S50, the control unit 21 analyzes the sound data, and makes preparations to display an icon of the sound data. After that, the flow advances to step S54.

If the determination in step S49 is negative, the flow advances to step S51. In step S51, the control unit 21 determines whether the data type identifier is image data (IMD). If this determination is affirmative, the flow advances to step S52. In step S52, the control unit 21 analyzes the image data, and rasterizes the image data on the screen. After that, the flow advances to step S54. On the other hand, if the determination in step S51 is negative, the flow advances to step S53. In step S53, the control unit 21 performs predetermined non-correspondence data processing. After that, the flow advances to step S54.

In step S53, the control unit 21 determines whether data to be processed remains, on the basis of the character number indicator CHN or the data amount processed so far. If this determination is negative, the flow returns to step S42 to repeat the processes in steps S42 to S54 described above until the determination in step S54 becomes affirmative. If the determination in step S54 is affirmative, the processing of subroutine S30 is terminated, and the flow advances to step S32 in FIG. 10.

When the flow advances to step S32 after the extension process, in step S32, the control unit 21 controls the display unit 13 to display an operation guidance within the range permitted in accordance with the copyright information and display the extension process results including the copyright information on the display unit 13. Examples of the extracted data displayed on the display unit 13 are shown in FIGS. 13 and 14.

Figure 13A:
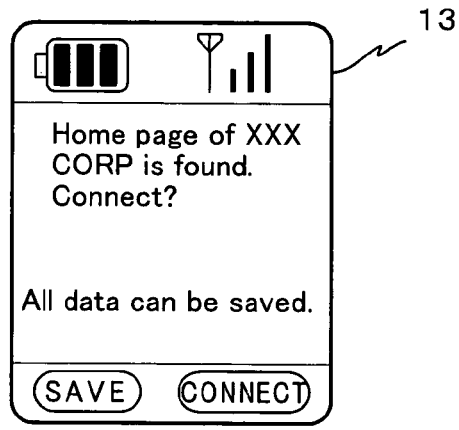
FIG. 13 is a view (No. 1) showing display examples of the results of the extension processing.
Figure 13B:
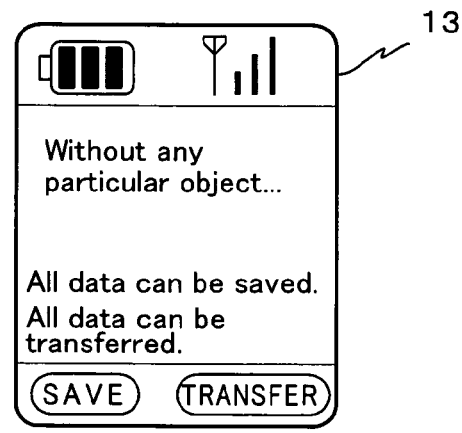

Referring FIG. 13A, it is shown that an example when the data type identifier DYID is URL non-display data (UND) and referring FIG. 13B, it is shown that an example when the data type identifier DYID is text data (TXD). Also referring FIG. 13C, it is shown that an example when the data type identifier DYID is binary data (BND) and referring FIG. 13D, it is shown that an example when the data type identifier DYID is sound data (MSD). Additionally referring FIG. 14A, it is shown that an example when the data type identifier DYID is image data (IMD) and referring FIG. 14B, it is shown that an example when the data type identifier DYID is text data (TXD) and sound data (MSD).

Figure 13C:
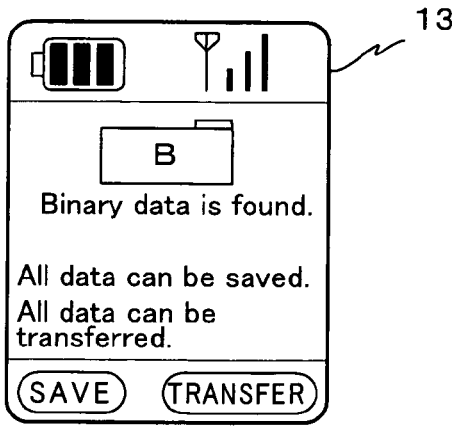
Figure 13D:
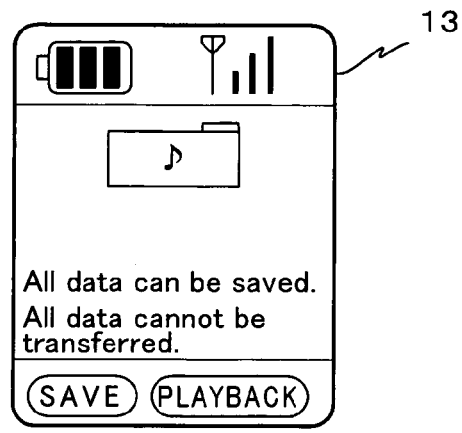
Figure 14A:
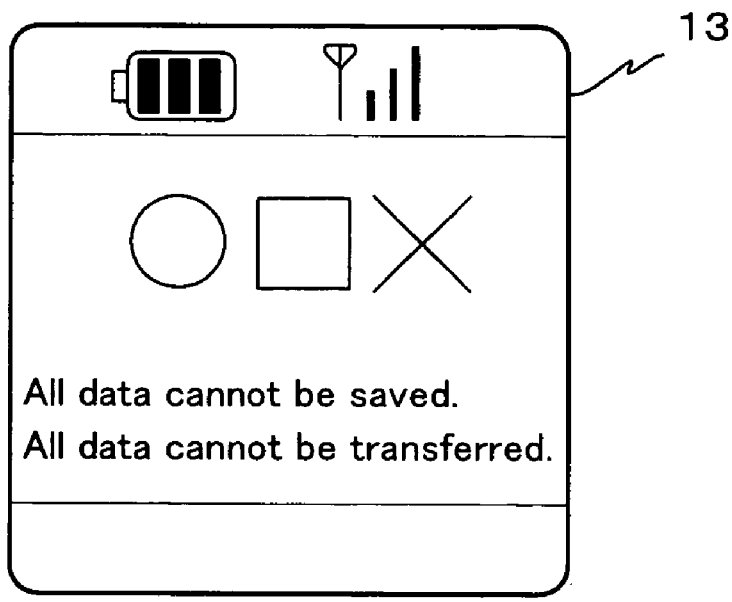
FIG. 14 is a view (No. 2) showing display examples of the results of the extension processing.
Figure 14B:
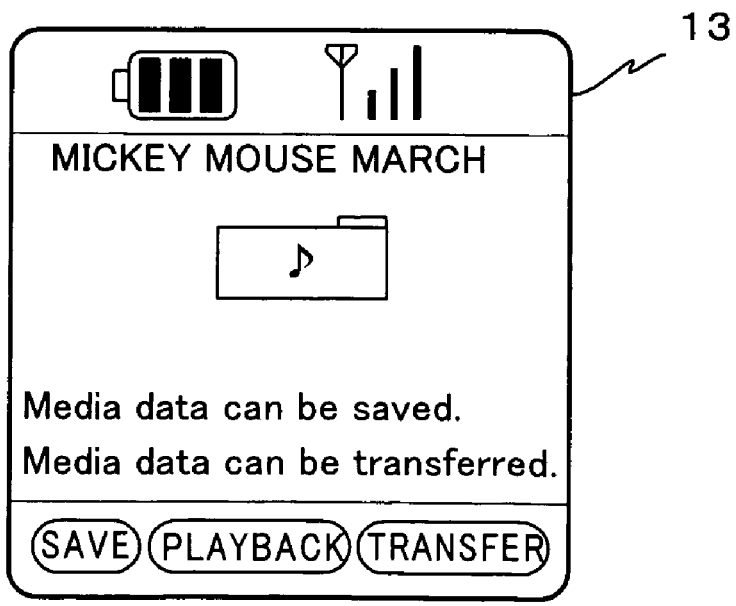

Note that it is illustrated in FIGS. 13A to 13C that examples in which the copyright information permits save and transfer of all data, and in FIG. 13D that an example in which the copyright information permits save but prohibits transfer of all data. Also, it is illustrated in FIG. 14A that an example in which the copyright information prohibits save and transfer of all data, and in FIG. 14B that an example in which the copyright information permits save and transfer of media data.

When the extension process results are thus displayed on the display unit 13, the operator of the cellular phone 10 operates the operation unit 12 to perform subsequent data processing, in accordance with the display of the copyright information.

In case that the QR symbol QRC contains a plurality of data blocks, the processes in steps S24 to S32 or the processes in steps S21 to S32 described above need only be performed for each of these data blocks.

In this embodiment as described above, the copyright information of content data in the two-dimensional code, which the copyright information is written in the predetermined position of the two-dimensional code optically read by the image sensing unit 18, is analyzed and consequently, display corresponding to the content data is performed, as well as display with regard to the process capable for the content data is performed in accordance with the result of analysis of the copyright information. Accordingly, information expressed as the two-dimensional code can be appropriately processed by reflecting the intention that the copyright holder has on the information.

Also, if the data type identifier written in the predetermined position of the two-dimensional code optically read by the image sensing unit 18 indicates the URL non-display, the URL data included in the content data is undisplayed. In the second information processing method of the present invention, it is therefore possible to display or undisplay the URL in accordance with the intention of the person who has expressed the URL by the two-dimensional code.

In addition, it is determined whether the data type identifier written in the predetermined position of the two-dimensional code optically read by the image sensing unit 18 indicates that the content data is binary data, and if this determination is affirmative, information indicating that the content data is binary data is displayed. Accordingly, it is possible to exchange the desired data having meanings only for the specific persons who know the data form, even when data having a desired form other than data forms generally used as the content data, is expressed by the two-dimensional code.

Note that in the above embodiment, the data type identifier may be set to the URL non-display for attaining the URL non-display. However, the URL mask data to be overwritten on URL display may also be included in data.

Note also that the two-dimensional code is the QR code in the above embodiment, but the present invention is applicable to arbitrary two-dimensional codes such as CODE16K, ULTRA CODE, and MAXI CODE.

Furthermore, although the present invention is applied to the cellular phone in the above embodiment, the present invention is, of course, also applicable to another apparatus such as a personal computer.

As has been described in detail above, the present invention is applicable to processing of information expressed by a two-dimensional code.

What is claimed is:

1. An information processing method of reading a two-dimensional code symbol in which information is expressed by a two-dimensional code, and processing the information expressed as the two-dimensional code symbol, comprising steps of:

optically reading the two-dimensional code symbol;
analyzing copyright information of content data in the two-dimensional code symbol, the copyright information being written in a predetermined position of the two-dimensional code symbol; and
performing display corresponding to the content data, as well as performing display with regard to a process capable for the content data in accordance with a result of analysis of the copyright information,
wherein the content data includes sound data, and the step of performing display corresponding to the content data displays an icon representing the sound data.

2. An information processing method according to claim 1, wherein the copyright information includes designation information which designates whether the content data can be saved and transferred, and whether media data in the content data can be saved and transferred.

3. An information processing method according to claim 2, wherein
the content data further includes text data, and
the step of performing display corresponding to the content data displays characters of the text data.

4. An information processing method according to claim 2, wherein
the content data includes image data, and
the step of performing display corresponding to the content data displays the image data with expansion.

5. An information processing method according to claim 1, wherein
the content data further includes text data, and
the step of performing display corresponding to the content data displays characters of the text data.

6. An information processing method according to claim 1, wherein the content data further includes image data, and the step of performing display corresponding to the content data displays the image data with expansion.

7. An information processing method according to claim 6, wherein the step of performing one of display and undisplay undisplays an URL when the content data type information includes a URL non-display designation.

8. An information processing method of reading a two-dimensional code symbol in which information is expressed by a two-dimensional code, and processing the information expressed as the two-dimensional code symbol, comprising steps of:

optically reading the two-dimensional code symbol; and
performing one of display and undisplay with regard to URL data included in content data in accordance with content data type information and the content data both written in a predetermined position of the two-dimensional code symbol, wherein
the step of performing one of display and undisplay undisplays an URL, when the content data further includes URL mask data to be overwritten on URL display.

9. An information processing method of reading a two-dimensional code symbol in which information is expressed by a two-dimensional code, and processing the information expressed as the two-dimensional code symbol, comprising steps of:

optically reading the two-dimensional code symbol;
determining whether content data type information written in a predetermined position of the two-dimensional code symbol indicates that content data is binary data;
displaying to a purport that the content data is binary data when an affirmative determination is made in the step of determining for the binary data;

determining whether the content data type information indicates that the content data includes sound data; and displaying an icon corresponding to the sound data when an affirmative determination is made in the step of determining for the sound data.

10. An information processing method according to claim 9, further comprising steps of:

determining whether the content data type information indicates that the content data includes text data; and displaying characters of the content data when an affirmative determination is made in the step of determining for the text data.

11. An information processing method according to claim 10, further comprising steps of:

determining whether the content data type information indicates that the content data includes image data; and displaying the image data with expansion when an affirmative determination is made in the step of determining for the image data.

12. An information processing method according to claim 11, further comprising steps of:

determining whether the content data type information indicates that the content data includes image data; and displaying the image data with expansion when an affirmative determination is made in the step of determining for the image data.

13. An information processing method according to claim 9, further comprising steps of:

determining whether the content data type information indicates that the content data includes image data; and displaying the image data with expansion when an affirmative determination is made in the step of determining for the image data.

* * * * *